United States Patent [19]

Nelson

[11] 4,191,965
[45] Mar. 4, 1980

[54] APPARATUS AND METHOD FOR TESTING COLOR SEQUENCING OF SECAM COLOR TELEVISION SIGNALS

[75] Inventor: Larry A. Nelson, Hillsboro, Oreg.

[73] Assignee: Tektronix, Inc., Beaverton, Oreg.

[21] Appl. No.: 923,755

[22] Filed: Jul. 11, 1978

Related U.S. Application Data

[63] Continuation of Ser. No. 799,417, May 23, 1977, abandoned.

[51] Int. Cl.² ............................................. H04N 9/62
[52] U.S. Cl. ...................................... 358/10; 358/14
[58] Field of Search ................................. 358/10, 14

[56] References Cited

U.S. PATENT DOCUMENTS

| | | | |
|---|---|---|---|
| 3,267,208 | 8/1966 | Brouard | 358/14 |
| 3,567,862 | 3/1971 | Carnt | 358/10 |

Primary Examiner—Richard Murray
Attorney, Agent, or Firm—Adrian J. LaRue; Kenneth Durk; William D. Haffner

[57] ABSTRACT

An apparatus and method for testing color sequencing of SECAM color television signals whereby any reversed color sequences will be immediately identifiable is provided. Specifically, the color sequence of SECAM picture monitor determined by white lead-in during the back porch interval or by Line Identification Signals during the vertical blanking interval is compared to a reference which can be internally derived and/or derived from another picture monitor or generator. If a difference is obtained, means are provided for visually or audibly indicating the color sequence error.

11 Claims, 2 Drawing Figures

APPARATUS AND METHOD FOR TESTING COLOR SEQUENCING OF SECAM COLOR TELEVISION SIGNALS

This is a continuation of application Ser. No. 799,417 filed May 23, 1977, now abandoned.

BACKGROUND OF INVENTION

It is well known that the television signal is a very complex signal, requiring precise timing and exacting analysis of its parameters in order to produce high picture quality and maintain it. Accordingly, instruments designed to improve and maintain picture quality for timing, testing, measuring, correcting, and displaying of the video signals are also well known. As an example, a picture monitor used in the television production and transmission facilities is required to present program material and test patterns for critical evaluation by both engineering and production people.

As is also well known, three basic or major television systems are commonly in use: NTSC (National Television System Committee) System; PAL (Phase Alternation Line) System; and the SECAM System which uses sequential chrominance signals and a memory device. Other systems such as ART and NIR exist, but since these systems are primarily not intended to be used for public transmission, they will not be given further consideration.

Basically, the difference between the three primary systems occurs "in the process which is used for transmitting the colouring signals", see "Colour Television" Volume II PAL, SECAM and Other Systems, by P. S. Carnt and G. B. Townsend, copyrighted by P. S. Carnt and G. B. Townsend, 1969, first published in 1969 by Iliffe Books Ltd for WIRELESS WORLD. For the sake of brevity, in the NTSC system, the initiation of the color television signal at the signal source starts with the generation of seven components on a line to line basis: horizontal line synchronization pulses; color sync (burst); set-up; picture detail; color hue; color saturation; and full field synchronization (field synchronization is an exception to the line to line basis). These seven components, when combined to form a continuous waveform, form the composite video signal. Of primary concern in color is, of course, the color burst used to frequency and phase lock the picture color information, color hue and color saturation. Since the television signal is not capable of transmitting color as color, but only as electrical signals proportional to certain characteristics of color, a transformation is made whereby primary red, green and blue video signals are translated into three well known related quantities; luminance, hue and saturation. The transformation is carried out by a resistive matrix to form the luminance (Y Signal) and two color-difference signals (R-Y, B-Y). Transmission of the two color-difference signals is accomplished by amplitude modulating carriers of identical frequency but differing in phase; the separation of the carriers is established at 90 degrees. These two modulated signals are then added together to feed a common transmission channel, forming a sum of the two modulated carriers. In addition, color sync phase (burst phase) of the NTSC System is changed each line with respect to the leading edge of horizontal sync i.e., if fields 1 and 2 have color sync which starts at zero and goes positive on a chosen line, then fields 3 and 4 have color sync which starts at zero and goes negative on the same line. This phase difference is unimportant in the decoding process. However, such phasing has an impact on studio equipment such as time base correctors associated with video tape recorders (VTR's) where it is imperative to be able to detect the phase of color sync or at least know whether or not the phase of burst (or color sync) is proper. That is to say, there are 4 fields in the NTSC signal where fields 1 and 3 (or fields 2 and 4) are identical except that burst is opposite phase on any given line. To verify that two NTSC signals are field synchronized, the line color sequence of burst must be known.

In PAL, the same signals exist as in the NTSC System, but one of the color difference signals (R-Y) is reversed in sign from line to line. Color decoding in PAL is therefore line sequential and the exact sequence has to be known to the decoder to decode the signal properly. This color sequence defines 4 distinct fields in PAL. In addition, burst phase measured with respect to sync also alternates similar to the NTSC signal as is well known. This defines an 8 field sequence. For video processing of two or more PAL signals it is sometimes necessary to synchronize all 8 fields of a plurality of PAL signals.

SECAM also uses the same color difference signals. However, they are encoded into a composite video signal using frequency modulation on a sequential line basis. Since the SECAM lines are transmitted line sequentially i.e., R-Y line followed by a B-Y line etc., it is necessary for the decoder to be able to deduce which line is being transmitted, else the colors of the reproduced picture may not be synchronized with the transmitter. The color sequence and basic synchronization signals are sufficient to define 4 fields of the SECAM signal. The exact phasing of the subcarrier is not yet firmly specified. For present uses, synchronization of these 4 fields of a plurality of SECAM signals appears sufficient for signal processing. Presently, the SECAM signal includes a color synchronizing signal which is transmitted during every field blanking interval to enable the decoder to check the switching sequence. This color synchronizing signal is well known as the Line Identification Signal which consists of 9 lines in the form of a subcarrier across the full width of the line with zero luminance. These line identification signals are transmitted on line 7 to 15 of fields 1 and 3 and on lines 320 to 328 of fields 2 and 4 of the picture. In fields 1 and 2, B-Y is transmitted on odd lines whereas R-Y is transmitted on even lines. In fields 3 and 4, the reverse is true. It should be mentioned that R-Y and B-Y color difference signals are sometimes referred to as $D'_R$ and $D'_B$ respectively. See the already referenced "Colour Television" or "SECAM Colour TV System", Compagnie Francaise De Television, Imprimerie Nord-Graphique.

In SECAM, the use of these line identification signals is a disadvantage however, in that 9 lines in each SECAM field could otherwise be used to provide vertical interval or insertion test signals which could be used for the improvement of the system operation by both engineering and production people as previously mentioned. This problem was considered in my previously filed application, Ser. No. 711,654, filed Aug. 4, 1976 which describes a SECAM decoder which did not require the use of the Line Identification Signals during vertical blanking for decoding purposes. When the vertical interval Line Identification Signals are not used for color sequence identification, the white reference present during the back porch of a SECAM color line must be used. This presents two further disadvantages: (a) within a single television signal the sequence information contained in the field blanking interval may differ from the information contained in the white reference. An operator using the white reference for color sequence could not tell this was the case, so the problem would pass unnoticed, and (b) for multiple sources of SECAM, when the white reference is used for color sequencing, the color sequence lock of all of the sources can not be easily verified before switching. This problem is exacerbated by the proposed deletion of the Line Iidentification Signals present during the vertical interval.

In PAL, most studio sources are gen-locked. Therefore, when a user views two or more PAL signals simultaneously, it is assumed that the PAL signals are synchronized with respect to color sequence. This assumption without verification constitutes a disadvantage. In NTSC, most studio sources have been synchronized with respect to the basic synchronization signals but not with respect to subcarrier phase which is necessary for editing with modern studio processing equipment. This 4 field synchronization of a plurality of NTSC signals is generally verified through the use of a waveform monitor which is a cumbersome procedure. This is, of course, a disadvantage.

Clearly, what is devoid in the prior art, whether NTSC, PAL or SECAM is a means or apparatus and method for testing color sequencing of the color television signals such as testing color sequencing lock between multiple sources or testing for color sequencing information conflicts when multiple sources of determining color sequence exists within a single television signal as outlined above.

SUMMARY OF INVENTION

The present invention is a means or apparatus and method of testing color sequencing of color television signals whereby incorrect or reverse color sequence will be immediately identifiable. In SECAM and PAL systems, all decoders (or a generator) presently generate signals which contain color synchronization signals. These signals can be used in combination with a studio reference to test the color synchronization of a plurality of color sources. Such studio reference could be taken from any one of these decoders, such decoder being designated as a master. The output signals from this master could be inputted to every decoder in the system, such decoders then being designated as slave decoders. The internal color sequence reference of any slave decoder derived from its incoming video signal could then be compared against the system master. If the slave monitors (decoders) were all externally synced, then a test of field synchronization between a plurality of sources would have been accomplished. Where burst phase is a consideration in field synchronization such as in NTSC or 8 fields in PAL, a burst phase detector would be incorporated in the apparatus, such devices being well known to those skilled in the art.

It is therefore an object of the present invention to provide an apparatus and method for testing color sequencing of color television signals whereby any reverse color sequence will be immediately identifiable.

The foregoing and numerous other objects, advantages, and inherent functions of the present invention will become apparent as the same is more fully understood from the following description and drawings which describe the invention in one preferred embodiment; it is to be understood, however, that the embodiment is not intended to be exhausting nor limiting of the invention but is given for the purposes of illustration in order that others skilled in the art may fully understand the invention and principles thereof, and the manner of applying it in practical use so that they may modify it in various forms, each as may be best suited to the conditions of the particular use.

DESCRIPTION OF INVENTION

Figure 1:
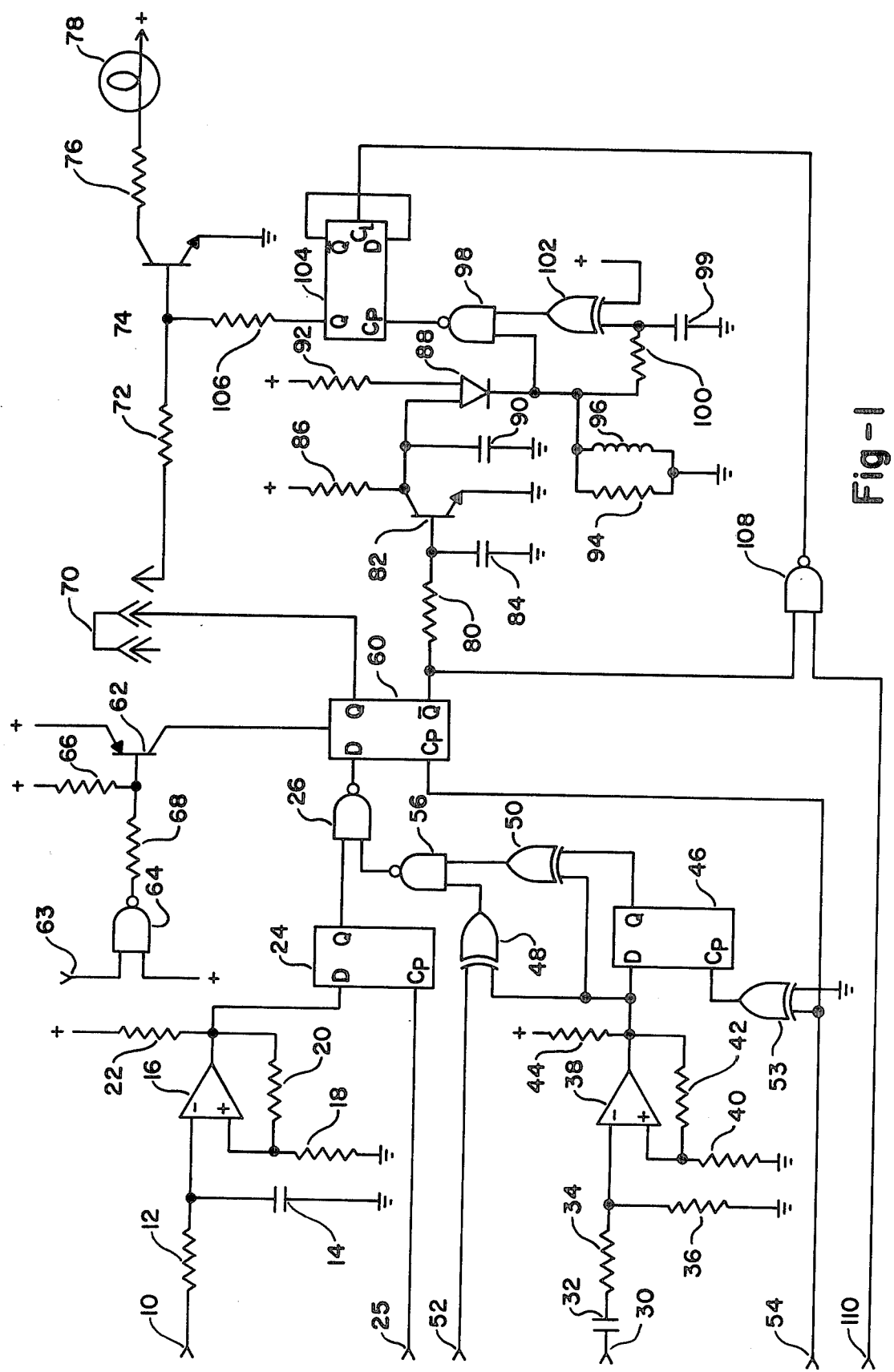
FIG. 1 is a schematic diagram of a circuit employed within a SECAM picture monitor which has proved useful for testing color sequencing of a SECAM color television signal or plurality thereof in accordance with the present invention.

One circuit which has proved useful for testing color sequencing of a color television signal in accordance with the present invention is shown in FIG. 1. With this circuit, any reverse color sequence will be immediately identifiable; immediately identifiable as a visually observable indication. It is, of course, possible that any reverse color sequence can be immediately identifiable as an audible indication. The circuit defines a specific circuit used in testing color sequencing of SECAM color television signals which include the previously mentioned Line Identification Signals. It is to be understood, however, that this circuit is not intended to limit the invention to SECAM Systems as similar NTSC and PAL versions thereof as a whole will be obvious to those having ordinary skill in the art in view of the foregoing described problems and the hereinafter described technique.

Figure 2:
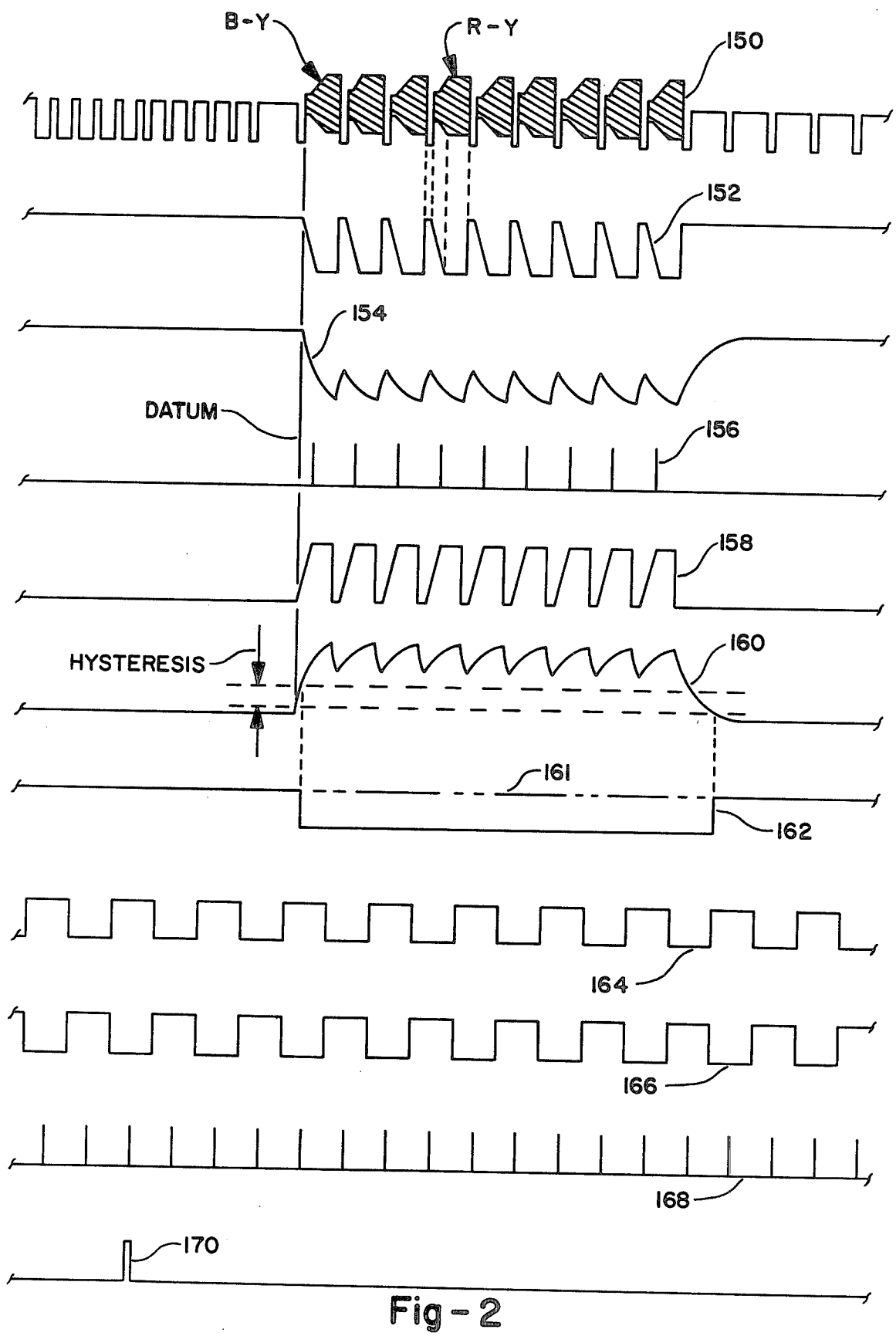
FIG. 2 is a series of time related graphs for depicting operation of the FIG. 1 circuit.

In the circuit, a decoded R-Y input signal is applied to an input 10. For example, there is shown in FIG. 2 a waveform 150. Waveform 150 is an example of a typical SECAM signal during the frame blanking interval to show the position of the Line Identification Signals. Also shown in FIG. 2 is the waveform 152 which represents the decoded R-Y signal. Notice that the waveform 152 contains only decoded R-Y (the B-Y has been removed). This technique is conventional in SECAM because of the addition of the delay line and the sequential nature of this system and will not be further discussed as it is believed to be well known to those having ordinary skill in the art. It should also be mentioned that the decoded R-Y signal is negative with respect to the base line level which is about zero volts as indicated by the constant signal level on lines before and after the nine lines of Line Identification Signals.

The decoded R-Y signal, waveform 152, is applied to the inverting input of an operational amplifier 16 via a low pass filter of first order comprising a resistor 12 disposed between input 10 and the inverting input of the operational amplifier 16, and a capacitor 14 coupled from the inverting input of operational amplifier 16 to ground. Accordingly, the waveform 152 is integrated by the filter producing the resultant waveform 154 which is applied to the operational amplifier 16. The filter is necessary in that during decoded of the R-Y signal, and in the absence of the Line Identification Signals, noise is generated. This noise is filtered so that it cannot affect operation of the circuit which otherwise might indicate a sequencing error which did not really exist.

Operational amplifier 16 has its output coupled to a voltage source via a resistor 22 and also has its output coupled to its non-inverting input via a feedback resistor 20. The non-inverting input is also returned to ground via resistor 18. Resistors 20 and 18 have ohmic values having a ratio of about 7:1 respectively, so that amplifier 16 has hysteresis. This hysteresis causes the operational amplifier to function as a comparator; another way to think of the operation of the amplifier 16 is to consider it as a Schmidt Trigger, operating between hysteresis levels in a conventional manner. Accordingly, the output of amplifier 16 remains at a level slightly below the potential of the voltage source when waveform 154 is applied thereto. (This high level is indicated by the dash and broken line 161 of a waveform 162.)

The output of amplifier 16 is also coupled as the data input of a "D" flip-flop 24, preferably a 74LS74 commercially available flip-flop. Flip-flop 24 is clocked from a pulse generated by conventional means at the SECAM line rate and which is applied via an input 25. This signal is delayed about one-half line so that it occurs about the center of each Line Identification Signal and only during the nine lines containing the Line Identification Signals. As the generation and delaying of such signal is well known, no further discussion thereof is believed necessary. This pulse is, however, the waveform 156 shown in FIG. 2. Accordingly, upon each occurrence of the clock pulse to the flip-flop 24, the data or high level, is transferred to the Q output thereof. This high Q output is then coupled to one input of the logical NAND gate 26.

Assume now, for example, that a reverse color sequence exists between the white reference present on the back porch and the Line Identification Signals present during vertical blanking and the decoder is sequencing color based upon the white reference subcarrier present on the back porch. Accordingly, the R-Y input signal would be the waveform 158 which is filtered to produce a resultant waveform 160. From the circuit and the waveform 160 it is seen that the reverse sequence causes the capacitor 14 to be charged such that the upper hysteresis level is reached thereby causing the output of the comparator 16 to rapidly switch to a low level and remain at the low level until the voltage on the capacitor 14 crosses through the lower hysteresis level causing the output of the comparator to rapidly switch back to the high level at the end of the last Line Identification Signal. This low level is indicated by the waveform 162. This low level is then coupled to the already mentioned one input of the NAND gate 26.

Thus, the circuit just described can be considered as an apparatus for sequence testing information contained in the field blanking interval and derived from information contained in the white reference within a single SECAM television signal which comprises a means for comparing (amplifier 16) an applied signal, the decoded R-Y which is representative of the sequence of the information contained in the field blanking information and derived from the white reference portion of the SECAM television signal, against a reference for providing an output when this applied signal exceeds the level of the reference and a means (flip-flop 24) responsive to the output only during the field blanking interval which provides continuous sequence confirmation as to whether or not the sequence is correct. This is therefore, an advantage over the prior art.

Reference should now be directed to an input 30 where is applied a reference signal whose frequency is one-half the SECAM line rate. This signal, the waveform 164, is the reference to which the color sequence is compared as previously stated. This reference signal is capacitively coupled via a capacitor 32 to a voltage divider comprising the resistors 34 and 36 whose ohmic values are equal. The resistor 34 is disposed between the capacitor 32 and the inverting input of a second operational amplifier 38 whereas the resistor 36 returns the inverting input of this second amplifier to ground. Disposed about amplifier 38 are a plurality of resistors 40, 42 and 44 which causes the amplifier 38 to operate similarly to the already discussed amplifier 16. The output of amplifier 38, the waveform 166, is also the data input of yet another "D" flip-flop 46 similar to the flip-flop 24. This amplifier output, which is TTL compatible is also coupled, however, to first inputs of EXCLUSIVE OR gates 48 and 50.

The second input of EXCLUSIVE OR gate 48 also receives an input signal via an input 52 and such input signal is also a reference signal whose frequency is at one-half the SECAM line rate, but which can be internal to the device utilizing the circuit or which can be from one of a plurality of other sources such as another picture monitor or generator. Assume for simplicity, that such signal is identical to the waveform 164. Accordingly, EXCLUSIVE OR gate 48 is utilized to compare the external reference with the internal reference.

Clocking flip-flop 46 via an exclusive OR gate 53, used for delay purposes to be described elsewhere is yet another line rate related signal applied at an input 54, but such signal is re-occurring every one-half line of every field. This is the waveform 168. The data input of flip-flop 46 is therefore transferred to its Q output and to the second input of gate 50 every one-half line, but delayed one-half line. The output of EXCLUSIVE OR gate 50 is therefore used to detect whether or not the incoming signals are line sequential. The output of the gates 48 and 50 are then logically nanded together via NAND gate 56 and an output is provided which drives the second input of NAND gate 26. As can be discerned, the output of NAND gate 56 will be high providing all sequencing is correct or it will be low if an out of sequence condition exists between the signals applied at the inputs 30 and 52.

Thus, the circuit including elements 30-56 can be considered as an apparatus for testing color sequencing of color television signals which comprises a means for providing first signals representative of the sequence of the color television signals to be tested, a means for providing second signals representative of the sequence of a reference color television signal and a means for comparing such signals to obtain a third signal if the sequence of the signals tested is different from the sequence of the reference. This is, of course, an advantage over the prior art in that sequence lock of the sources can be easily verified.

Accordingly, the inputs to NAND gate 26 are both high if the Line Identification Signals are not reversed and the signals at inputs 30 and 52 are in phase. Otherwise, the output of NAND gate 26 is low when flip-flop 60 is clocked. This output of NAND gate 26 is the data input of this "D" flip-flop 60, preferably another 74LS74. Operation of the flip-flop 60 is, however, somewhat different than the operation of flip-flops 24 and 46 in that it is enabled only during the presence of a color signal. That is to say, power is applied to operate the flip-flop 60 only when a color enable signal conventionally derived, causes a transistor 62 to be turned on thereby providing operating power to the flip-flop 60. This color enable signal is applied via an input 63 to a NAND gate 64 whose second input is held to a high level. Therefore, a high color enable signal causes transistor 62 to saturate, thereby applying the operating power to the flip-flop 60. The resistors 66 and 68 provide the proper bias and pull-up for this turn-on circuit.

Assuming that a color enable signal is present at the input of NAND gate 64, the data input to the flip-flop 60 is transferred to the Q output thereof according to the clock pulse which is the already mentioned line rate one-half line position pulse occurring every line and applied at the input 54. As can be discerned, since flip-flop 46 is clocked by delaying the signal 168 whereas the flip-flop 60 is directly clocked by the signal 168 a time difference exists in the action of the two flip-flops 46 and 60, thus preventing a race condition. In the embodiment shown, the Q output of the flip-flop 60 may be selectively utilized to drive the means for visually or audibly indicating a reverse color sequence. For example, the drawing has selector 70 placed in a first position so that the Q output is open. In the second position of the selector 70, the Q output is coupled via a resistor 72 to the base of a grounded emitter NPN transistor 74, the collector of which is coupled via a resistor 76 to the indicating means such as the lamp 78. Assuming that a sequence error exists, the Q output will be high which causes the transistor 74 to saturate thereby providing current to the lamp 78 to visually indicate that the sequence error exists. The lamp 78 would be, for convenience, located whereby engineering or production personnel would instantly recognize that the sequence error had occurred. Generally, if the circuit is being utilized in a picture monitor, the lamp would be on the front panel thereof.

The $\overline{Q}$ output of the flip-flop 60 is utilized to drive a flashing circuit whereby the lamp 78 is made to alternate between an on and off condition whenever the selector 70 is placed where the Q output of the flip-flop 60 is open.

The flashing circuit consists of a filter comprising a resistor 80 coupled between the $\overline{Q}$ output of the flip-flop 60 and the base of yet another grounded emitter NPN transistor 82, and a capacitor 84 coupling the base of transistor 82 to ground. The collector of the transistor 82 is coupled via a resistor 86 to a suitable source of potential as well as the anode of a programable unjunction transistor 88. Additionally, the collector is coupled to ground via a capacitor 90. The gate of the programable unjunction transistor 88 is coupled via a resistor 92 to a source of reference potential, whereas its output is coupled to a parallel RL network comprising a resistor 94 and an inductor 96 whose other terminals are grounded. The output of the programable unjunction transistor 88 is also coupled to a NAND gate 98 and a resistor 100. Resistor 100 is coupled to ground via a capacitor 99 and to the first input of an EXCLUSIVE OR gate 102 whose second input is directly coupled to a source of reference potential. The output of the gate 102 is coupled to the second input of the NAND gate 98, the output of which serves as the clock input of yet another "D" flip-flop 104 whose D input and $\overline{Q}$ output are connected together such that the flip-flop forms a divide by two counter. The Q output of the flip-flop 104 is coupled to the base of the already mentioned transistor 74 via a resistor 106. The flip-flop 60 has a clear input coupled to a NAND gate 108 which obtains first and second inputs from the $\overline{Q}$ output of the flip-flop 60 as well as a signal which occurs one time every 4 fields. This pulse is usually generated such that it occurs simultaneously with the first equalizing pulse following the vertical serration of the field 1 signal (middle of line 3) and such pulse is the waveform 170 of FIG. 2 applied via an input 110.

Assuming for the moment, that a sequence error did exist, it has been stated that the Q output of the flip-flop 60 will be high but disconnected if the connect selector 70 is in the position shown. With $\overline{Q}$ output low, transistor 82 will be non-conducting. Under these conditions, the programmable unjunction transistor 88 along with the parallel LR network comprising the resistor 94 and inductor 96 will act as an oscillator in accordance with the charge in, or the voltage across, the capacitor 90. In other words, when the transistor 82 is non-conducting the capacitor 90 is charged via the resistor 86. When the voltage on the capacitor 90 reaches the voltage on the gate input to the transistor 88 as determined by the resistor 92, transistor 88 conducts causing a current to flow through the inductor 96. Consequently, a very fast spike occurs thereby discharging capacitor 90 to a level whereby the transistor 88 stops conducting. The positive pulse generated across the inductor 96 is then applied to the gates 98 and 102 which, convert this fast rising pulse into a clock signal which is TTL compatible with the flip-flop 104. This TTL compatible clock toggles the flip-flop 104 which causes the transistor 74 to be alternately on, off, causing the lamp 78 to therefore be alternated between an off condition and an on condition. This, of course, provides the operating personnel a different type of a indication that a sequencing error has occurred. If there is no sequence error, the output of the flip-flop 60 will be Q low and $\overline{Q}$ high. This high, causes the transistor 82 to conduct thereby disabling the oscillator and the generation of the signal necessary to alternately turn the transistor 74 on and off. The NAND gate 108 ensures that when the $\overline{Q}$ output of flip-flop 60 is high indicating that a sequencing error does not exist, that the flip-flop 104 is cleared ensuring that the Q output thereof is at a low level and cannot initiate the indicating device.

While there has been shown and described the preferred embodiments of the present invention, it will be apparent to those skilled in the art that many changes and modifications may be made without departing therefrom in its broader aspects. For example, if gate 26 has N+1 inputs, where N is the number of inputs from N circuits comprised of elements 30–56, each separately driving an input of gate 26, then the color sequence of N sources could be tested with a single indicator. Similarly, by duplicating elements 10–25, with gate 26 having 2 N inputs, these N circuits could be tested for sequence conflicts each within themselves. Therefore, the appended claims are intended to cover all such changes and modifications as fall within the true spirit and scope of this invention.

The invention is claimed in accordance with the following:

1. The method of testing color sequencing of multiple color television signals, which comprises:
   providing first signals representative of the sequence of the color television signals to be tested;

providing second signals representative of the sequence of a reference color television signal;

comparing said first and said second signals to obtain a third signal if the sequence of the color television signals to be tested is different from the sequence of said reference color television signal, said third signal providing immediate identification of said difference.

2. An apparatus for testing color sequencing of color television signals, comprising:

means for providing first signals representative of the sequence of the color television signals to be tested;

means for providing second signals representative of the sequence of a reference color television signal; and means for comparing said first and said second signals to obtain a third signal if the sequence of the color television signals to be tested is different from the sequence of said reference color television signal, providing immediate identification of said difference.

3. The apparatus according to claim 2 further comprising means responsive to said third signal for indicating said difference.

4. The apparatus according to claim 3 wherein said means responsive defines a visual means for providing the indication.

5. The apparatus according to claim 3 wherein said means responsive defines an audible means for providing the indication.

6. An apparatus for sequence testing information contained in the field blanking interval and derived from information contained in the white reference within a single SECAM television signal, the apparatus comprising:

means for comparing an applied signal representative of the sequence of information contained in the field blanking information and derived from the white reference of the SECAM television signal against a reference for providing an output when said applied signal exceeds the level of said reference; and means responsive to said output during the field blanking interval for providing continuous sequence confirmation.

7. The apparatus according to claim 6 further comprising means responsive to said continuous sequence confirmation for providing a visually observable indication thereof.

8. The apparatus according to claim 6 further comprising means responsive to the continuous sequence confirmation for providing an audible indication thereof.

9. An apparatus for testing color sequencing of color television signals, the apparatus comprising:

means for providing first signals representative of the sequence of the color television signals to be tested;

means for providing second signals representative of the sequence of a reference color television signal;

means for comparing said first and said second signals to obtain a third signal if the sequence of the color television signals to be tested is different from the sequence of said reference color television signal, providing immediate identification of said difference;

means for comparing an applied signal representative of the sequence information contained in the field blanking information and derived from the white reference of the color television signal for providing an output when said applied signal exceeds the level of said reference;

means responsive to said output during the field blanking interval for providing continuous sequence confirmation; and indicating means responsive to said third signal for indicating said difference and said continuous sequence confirmation.

10. The apparatus according to claim 9, wherein said indicating means provides a visually observable indication.

11. The apparatus according to claim 9, wherein said indicating means provides an audible indication.

* * * * *